(12) United States Patent
Kimura

(10) Patent No.: US 9,018,909 B2
(45) Date of Patent: Apr. 28, 2015

(54) BATTERY PACK

(75) Inventor: Kenji Kimura, Miyoshi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 379 days.

(21) Appl. No.: 13/511,052

(22) PCT Filed: Apr. 28, 2011

(86) PCT No.: PCT/JP2011/002510
§ 371 (c)(1),
(2), (4) Date: May 21, 2012

(87) PCT Pub. No.: WO2012/147137
PCT Pub. Date: Nov. 1, 2012

(65) Prior Publication Data
US 2012/0242291 A1    Sep. 27, 2012

(51) Int. Cl.
*H02J 7/00*    (2006.01)
*B60L 1/06*    (2006.01)
*B60L 11/18*    (2006.01)

(52) U.S. Cl.
CPC ........... *B60L 1/06* (2013.01); *H02J 2007/0067* (2013.01); *B60L 11/1875* (2013.01); *B60L 11/1868* (2013.01); *B60L 11/1879* (2013.01); *B60L 2240/545* (2013.01)

(58) Field of Classification Search
CPC ........... Y02T 10/7005; Y02T 10/7022; Y02T 10/7072; Y02T 10/7038
USPC .......... 320/101, 112, 126–128, 134, 166–167
See application file for complete search history.

(56) References Cited

U.S. PATENT DOCUMENTS

| | | | | |
|---|---|---|---|---|
| 4,528,767 A | * | 7/1985 | Smith, Jr. ................... | 43/19.2 |
| 6,218,643 B1 | * | 4/2001 | Iwata et al. .................. | 219/202 |
| 2004/0219409 A1 | * | 11/2004 | Isogai ............... | 429/26 |
| 2007/0111087 A1 | * | 5/2007 | Tsai .............................. | 429/100 |
| 2008/0190679 A1 | * | 8/2008 | Sato et al. .................... | 180/68.5 |
| 2010/0297483 A1 | | 11/2010 | Kawai | |
| 2011/0080133 A1 | * | 4/2011 | Tamburrino et al. .......... | 320/101 |
| 2011/0177377 A1 | * | 7/2011 | Dube ............................ | 429/153 |
| 2011/0262777 A1 | * | 10/2011 | Choi et al. ........................ | 429/7 |
| 2011/0281144 A1 | * | 11/2011 | Yoon et al. ........................ | 429/7 |
| 2012/0007546 A1 | * | 1/2012 | Eager et al. ................... | 320/103 |

FOREIGN PATENT DOCUMENTS

| | | |
|---|---|---|
| JP | 11 332023 | 11/1999 |
| JP | 2003 86254 | 3/2003 |

(Continued)

OTHER PUBLICATIONS

International Search Report Issued Dec. 6, 2011 in PCT/JP11/02510 Filed Apr. 28, 2011.

*Primary Examiner* — Paul Dinh
(74) *Attorney, Agent, or Firm* — Oblon, McClelland, Maier & Neustadt, L.L.P.

(57) ABSTRACT

A battery pack includes a first battery and a second battery connected electrically in parallel and performing charge and discharge, and a heater generating heat. The first battery can perform charge and discharge with a current larger than that of the second battery. The second battery has an electric storage capacity larger than that of the first battery. The heater is placed at a position closer to the first battery than the second battery.

14 Claims, 5 Drawing Sheets

(56) References Cited

FOREIGN PATENT DOCUMENTS

| JP | 2006 79987 | 3/2006 |
| JP | 2006-079987 A | 3/2006 |
| JP | 4082147 | 2/2008 |
| JP | 2009 4237 | 1/2009 |
| JP | 2010 205591 | 9/2010 |

\* cited by examiner

BATTERY PACK

TECHNICAL FIELD

The present invention relates to a battery pack in which high-power batteries and high-capacity batteries are connected electrically in parallel.

BACKGROUND ART

When the temperature of a secondary battery drops, the output thereof may be reduced. To address this, there are techniques for heating the secondary battery in order to suppress the reduced output of the secondary battery. When an assembled battery is formed by using a plurality of secondary batteries, the whole assembled battery is heated.

PRIOR ART DOCUMENT

Patent Document

[Patent Document 1] Japanese Patent Laid-Open No. 11 (1999)-332023
[Patent Document 2] Japanese Patent No. 04082147
[Patent Document 3] Japanese Patent Laid-Open No. 2006-079987
[Patent Document 4] Japanese Patent Laid-Open No. 2003-086254

SUMMARY OF THE INVENTION

Problems to be Solved by the Invention

In heating the whole assembled battery by a heater, the heater is inevitably increased in size, and the increased size of the heater consumes higher power.

Means for Solving the Problems

A battery pack according to the present invention includes a first battery and a second battery connected electrically in parallel and performing charge and discharge, and a heater generating heat. The first battery can perform charge and discharge with a current larger than that of the second battery. The second battery has an electric storage capacity larger than that of the first battery. The heater is placed at a position closer to the first battery than the second battery.

A holder can be used to hold the first battery and the second battery. The heater can be fixed to the holder. For example, a plurality of opening portions passing through the holder can be formed in the holder, and the first battery and the second battery can be inserted into the opening portions to hold the first battery and the second battery. The holder can be formed of metal, for example. The metal used to form the holder allows the heat produced in the first battery and the second battery due to charge and discharge to be easily transferred to the holder, thereby making it possible to suppress a rise in temperature of the first battery and the second battery.

The holder can include a first holding portion holding the first battery and a second holding portion holding the second battery. A region (referred to as a heat-transfer suppressing region) having a thermal conductivity lower than that of the first holding portion can be placed between the first holding portion and the second holding portion. This can suppress heat transfer between the first holding portion and the second holding portion to supply the heat of the heater principally to the first battery (including the first holding portion). For example, each of the first holding portion and the second holding portion can be formed of metal, and the heat-transfer suppressing region can be formed of resin.

A plurality of first batteries and a plurality of second batteries can be used. The plurality of first batteries and the plurality of second batteries are connected electrically in parallel. When the plurality of first batteries are aligned in one direction, the heater can be placed along the direction in which the plurality of first batteries are aligned. A cylinder-type battery can be used as the first battery and the second battery.

Effect of the Invention

According to the present invention, since the heater is placed for the first battery, the heater can be reduced in size as compared with the case where the heater is placed for each of the first battery and the second battery. The reduced size of the heater can reduce the power consumed by the heater.

The first battery can perform charge and discharge with a current larger than that of the second battery. Even when the temperature of the battery pack drops to reduce the output of the second battery, the output of the first battery can be used to suppress a reduction in output of the battery pack. When the temperature drop also reduces the output of the first battery, the output of the battery pack can be restored only by heating the first battery.

MODE FOR CARRYING OUT THE INVENTION

An embodiment of the present invention will hereinafter be described.

[Embodiment 1]

Figure 1:
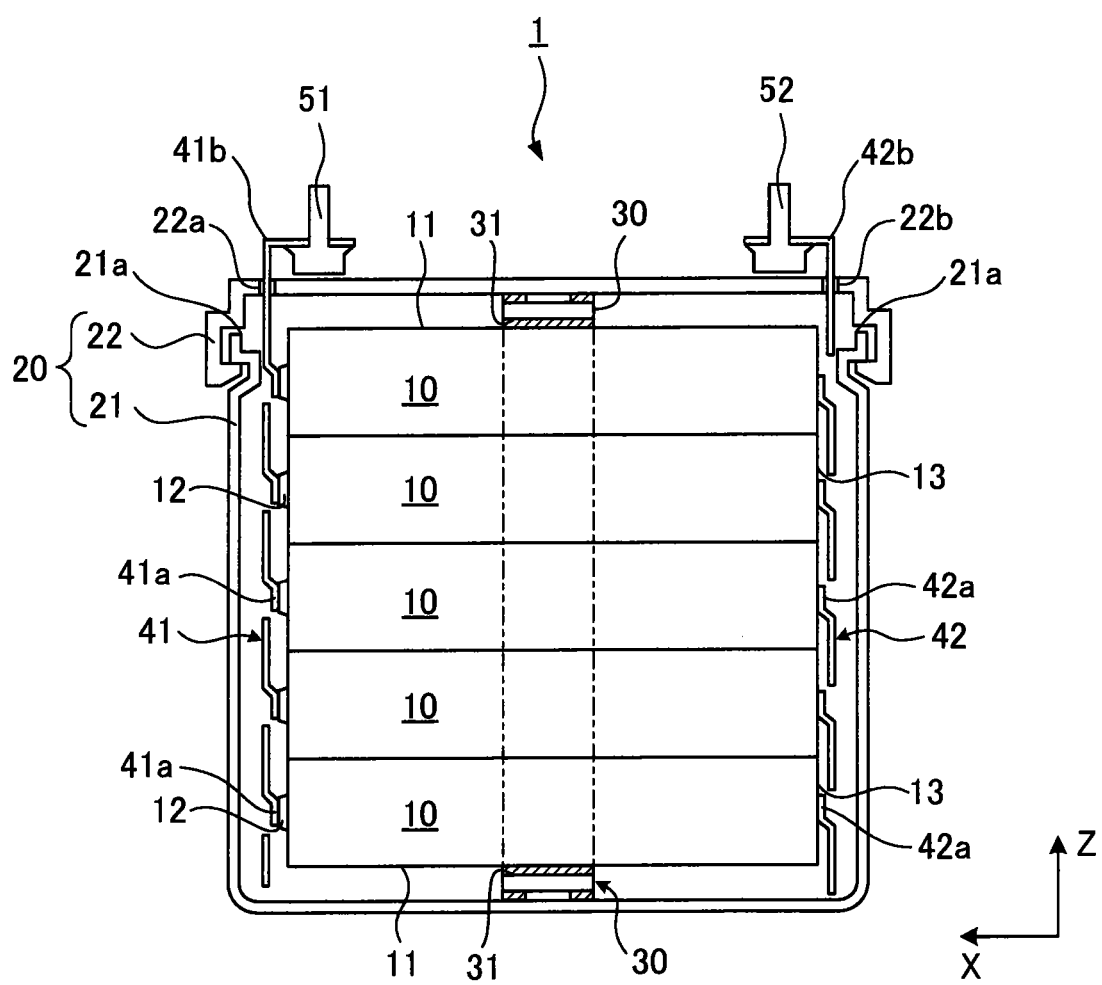
FIG. 1 A diagram showing the internal structure of a battery pack which is Embodiment 1.

A battery pack which is Embodiment 1 of the present invention is described. FIG. 1 is a diagram showing the internal structure of the battery pack which is the present embodiment.

The battery pack 1 has a plurality of cells 10 and a case 20 for housing the plurality of cells 10. The case 20 has a case body 21 and a lid 22. The lid 22 is fixed to an upper end portion of the case body 21 and closes an opening portion 21a formed in the case body 21.

Figure 2:
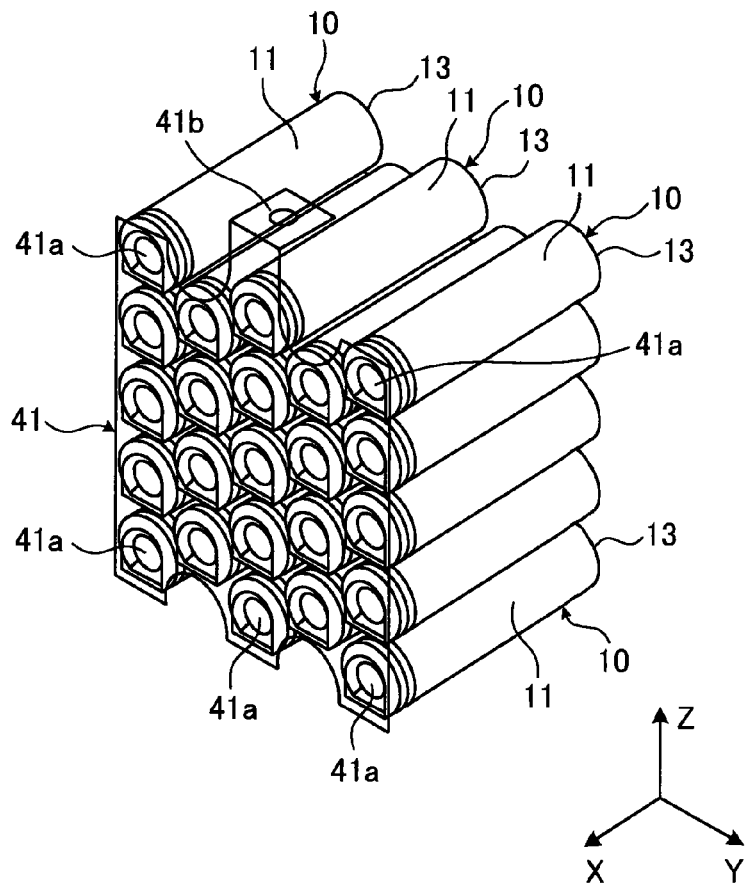
FIG. 2 A diagram showing the placement of a plurality of cells in Embodiment 1.

The plurality of cells 10 housed in the case 20 are placed as shown in FIG. 2. In FIG. 1 and FIG. 2, an X axis, a Y axis, and a Z axis are axes orthogonal to each other. The plurality of cells 10 are arranged in order in a Y-Z plane. Alternatively, the plurality of cells 10 may be placed in an arrangement different from that shown in FIG. 2. The number of the cells 10 can be selected as appropriate in view of the input/output characteristics of the battery pack 1.

The cell 10 is a so-called cylinder-type cell. Specifically, the cell 10 extends in the X direction and has a circular cross-section in the Y-Z plane. A secondary battery such as a nickel metal hydride battery or a lithium-ion battery can be used as the cell 10. The cell 10 has a battery case 11 and a power-generating element housed in the battery case 11. The power-generating element is an element responsible for charge and discharge and has a positive electrode plate, a negative electrode plate, and a separator placed between the positive electrode plate and the negative electrode plate. The separator contains an electrolytic solution.

A positive electrode terminal 12 and a negative electrode terminal 13 are provided at the ends of the cell 10 in the X direction. The positive electrode plate of the power-generating element is connected electrically to the positive electrode terminal 12. The positive electrode terminal 12 is formed of a protruding face. The negative electrode plate of the power-generating element is connected electrically to the negative electrode terminal 13. The negative electrode terminal 13 is formed of a flat face. The positive electrode terminal 12 and the negative electrode terminal 13 form the battery case 11.

Figure 3:
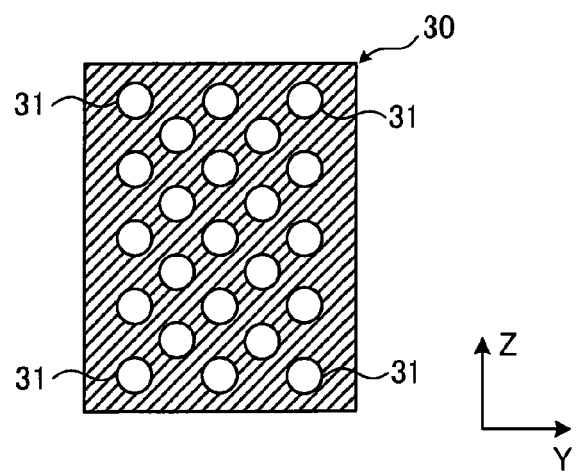
FIG. 3 A front view of a holder in Embodiment 1.

The plurality of cells 10 are held by a holder 30. The holder 30 is omitted in FIG. 2. As shown in FIG. 1, the holder 30 holds each of the cells 10 at the center in the X direction. As shown in FIG. 3, the holder 30 has as many holding portions 31 as the cells 10. The holding portion 31 is formed as an opening portion which passes through the holder 30.

As seen from the shape of the holder 30 shown in FIG. 3, the plurality of cells 10 are placed in order in the Y-Z plane. Specifically, columns of five cells 10 aligned in the Z direction and columns of four cells 10 aligned in the Z direction are alternately placed in the Y direction.

While the holder 30 holds the center of the cell 10 in the present embodiment, the holder 30 may hold a different portion. In addition, a plurality of holders 30 may be used to hold the plurality of cells 10. The plurality of holders 30 hold the cells 10 at different portions.

The cell 10 is inserted into the holding portion 31, and an adhesive is filled into the spacing formed between the holding portion 31 and the cell 10. For example, an epoxy resin can be used as the adhesive. The filling of the adhesive into the spacing formed between the holding portion 31 and the cell 10 can fix the cell 10 to the holder 30.

The holder 30 can be formed of metal such as aluminum, by way of example. The metal used to form the holder 30 can enhance heat radiation of the cell 10. The cell 10 may produce heat due to charge and discharge. When the holder 30 is formed of metal, the heat produced in the cell 10 can be easily dissipated to the holder 30 to suppress a rise in temperature of the cell 10.

The holder 30 is fixed to the case 20. A known structure can be used appropriately as the structure for fixing the holder 30 to the case 20. For example, the holder 30 can be fixed to the case 20 by using bolts.

The positive electrode terminals 12 in the plurality of cells 10 are located on the same side of the holder 30 and are connected to a connection member 41. The connection member 41 is formed of a material having conductivity such as metal. The connection member 41 has contact portions 41a each in contact with the positive electrode terminal 12, and the number of contact portions 41a is the same as that of the cells 10 (positive electrode terminals 12). The contact portion 41a and the positive electrode terminal 12 can be welded.

The connection member 41 has a lead portion 41b which passes through an opening portion 22a formed in the lid 22 to protrude to the outside of the case 20. A positive electrode terminal 51 of the battery pack 1 is fixed to the lead portion 41b.

The negative electrode terminals 13 in the plurality of cells 10 are located on the same side of the holder 30 and are connected to a connection member 42. The connection member 42 is formed of a material having conductivity such as metal. The connection member 42 has the similar structure to that of the connection member 41 and has contact portions 42a each in contact with the negative electrode terminal 13. The number of contact portions 42a is the same as that of the cells 10 (negative electrode terminals 13). The contact portion 42a can be welded to the negative electrode terminal 13.

The connection member 42 has a lead portion 42b which passes through an opening portion 22b formed in the lid 22 to protrude to the outside of the case 20. A negative electrode terminal 52 of the battery pack 1 is fixed to the lead portion 42b.

Since the single connection member 41 is connected to the plurality of positive electrode terminals 12, and the single connection member 42 is connected to the plurality of negative electrode terminals 13, the plurality of cells 10 can be connected electrically in parallel. While the connection members 41 and 42 have the same structure in the present embodiment, the present invention is not limited thereto. To connect the connection member 42 with the negative electrode terminal 13 formed of the flat face, the connection member 42 formed as a flat plate can be used, for example.

Figure 4:
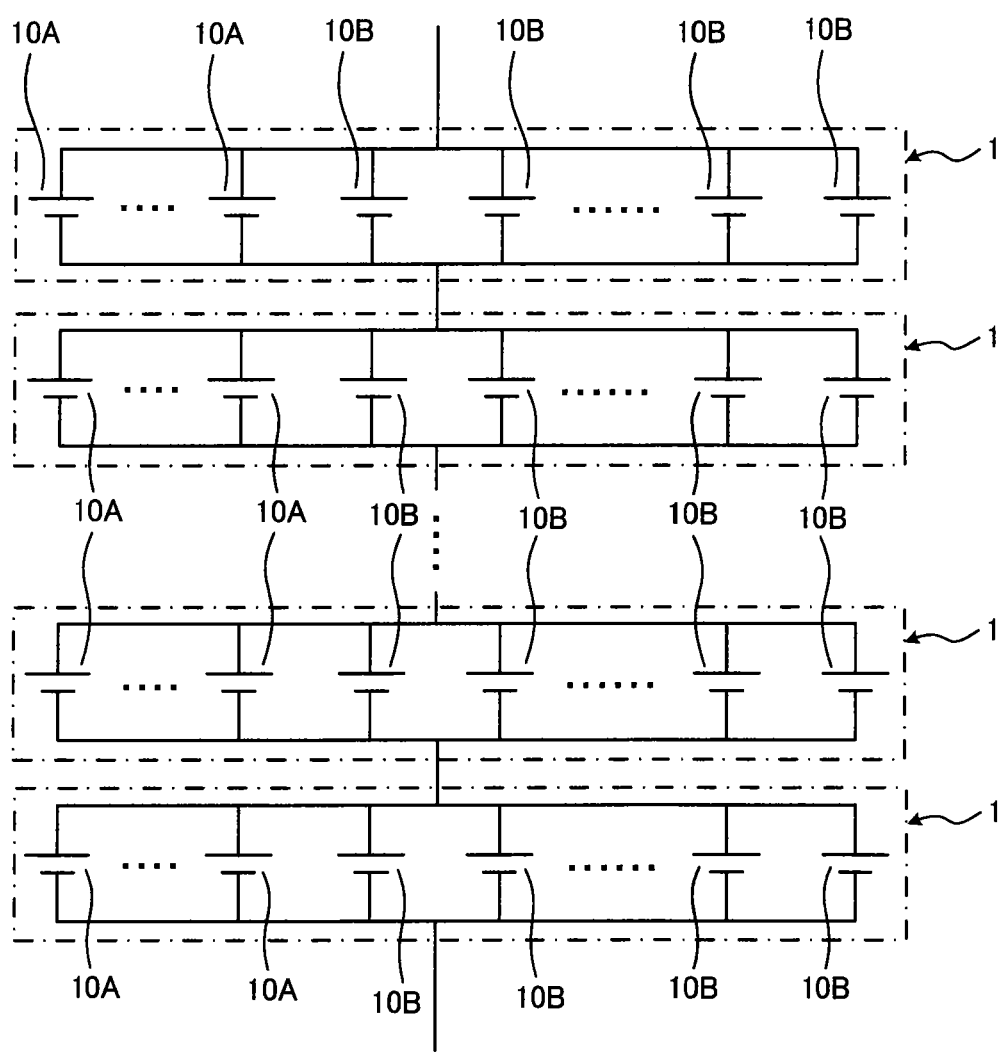
FIG. 4 A diagram showing the configuration of a plurality of battery packs connected electrically in series in Embodiment 1.

The battery pack 1 can be used as a power source for driving of a vehicle. Specifically, a plurality of battery packs 1 connected electrically in series can be mounted on a vehicle as shown in FIG. 4. The number of the battery packs 1 mounted on the vehicle can be set as appropriate in view of the output requirements of the vehicle and the like.

The plurality of battery packs 1 connected electrically in series can be connected to a motor generator. The motor generator receives the power output from the battery pack 1 to generate kinetic energy for driving of the vehicle. In addition, the motor generator converts kinetic energy produced in breaking of the vehicle into electric energy and supplies the electric energy to the battery pack 1. The battery pack 1 can store the power (regenerative power) from the motor generator.

An inverter or a step-up circuit may be placed between the battery pack 1 and the motor generator. When the inverter is used, an AC motor can be used as the motor generator. When the step-up circuit is used, the output voltage of the battery pack 1 can be increased and the output voltage of the motor generator can be reduced.

Since the plurality of cells 10 are connected electrically in parallel in each of the battery packs 1, the capacity of the battery pack 1 can be increased as compared with the case in which a plurality of cells 10 are connected electrically in series. This can extend the driving distance of the vehicle using the output of the battery pack 1.

As shown in FIG. 4, the battery pack 1 has high-power batteries (corresponding to first batteries) 10A and high-capacity batteries (corresponding to second batteries) 10B as the cells 10. The high-power battery 10A is a battery capable of charge and discharge with a larger current than that of the high-capacity battery 10B. The high-capacity battery 10B is a battery having a larger electric storage capacity than that of the high-power battery 10A.

The high-power battery 10A and the high-capacity battery 10B have the relationship shown in Table 1 below when compared.

TABLE 1

| | characteristics of cell | | characteristics of electrode | |
|---|---|---|---|---|
| | output [W/kg] [W/L] | capacity [Wh/kg] [Wh/L] | output [mA/cm$^2$] | capacity [mAh/g] [mAh/cc] |
| high-power cell 10A | high | small | high | small |
| high-capacity cell 10B | low | large | low | large |

In Table 1, the output of the cell 10 (10A and 10B) can be represented as the power of the cell 10 per unit mass ([W/kg]) or the power of the cell 10 per unit volume ([W/L]), for example. In terms of the output of the cell 10, the high-power battery 10A is higher than the high-capacity battery 10B. Assuming that the cells 10 have the equal mass or volume, the output [W] of the high-power battery 10A is higher than the output [W] of the high-capacity battery 10B.

The capacity of the cell 10 (10A and 10B) can be represented as the capacity of the cell 10 per unit mass ([Wh/kg]) or the capacity of the cell 10 per unit volume ([Wh/L]), for example. In terms of the capacity of the cell 10, the high-capacity battery 10B is larger than the high-power battery 10A. Assuming that the cells 10 have the equal mass or volume, the capacity [Wh] of the high-capacity battery 10B is larger than the capacity [Wh] of the high-power battery 10A.

In Table 1, the output of the electrode of the cell 10 can be represented as the current value of the electrode per unit area ([mA/cm$^2$]), for example. In view of the output of the electrode, the high-power battery 10A is higher than the high-capacity battery 10B. Assuming that the electrodes have the equal area, the value of current passing through the electrode of the high-power battery 10A is higher than the value of current passing through the electrode of the high-capacity battery 10B.

The capacity of the electrode of the cell 10 can be represented as the capacity of the electrode per unit mass ([mAh/g]) or the capacity of the electrode per unit volume ([mAh/cc]), for example. In view of the capacity of the electrode, the high-capacity battery 10B is larger than the high-power battery 10A. Assuming that the electrodes have the equal mass or volume, the capacity of the electrode of the high-capacity battery 10B is larger than the capacity of the electrode of the high-power battery 10A.

When the lithium-ion battery is used as the cells 10A and 10B, hard carbon (non-graphitizable carbon material) can be used as a negative electrode active material of the high-power battery 10A, and a lithium-manganese composite oxide can be used as a positive electrode active material of the high-power battery 10A. Graphite can be used as a negative electrode active material of the high-capacity battery 10B, and a lithium-nickel composite oxide can be used as a positive electrode active material of the high-capacity battery 10B.

Figure 5:
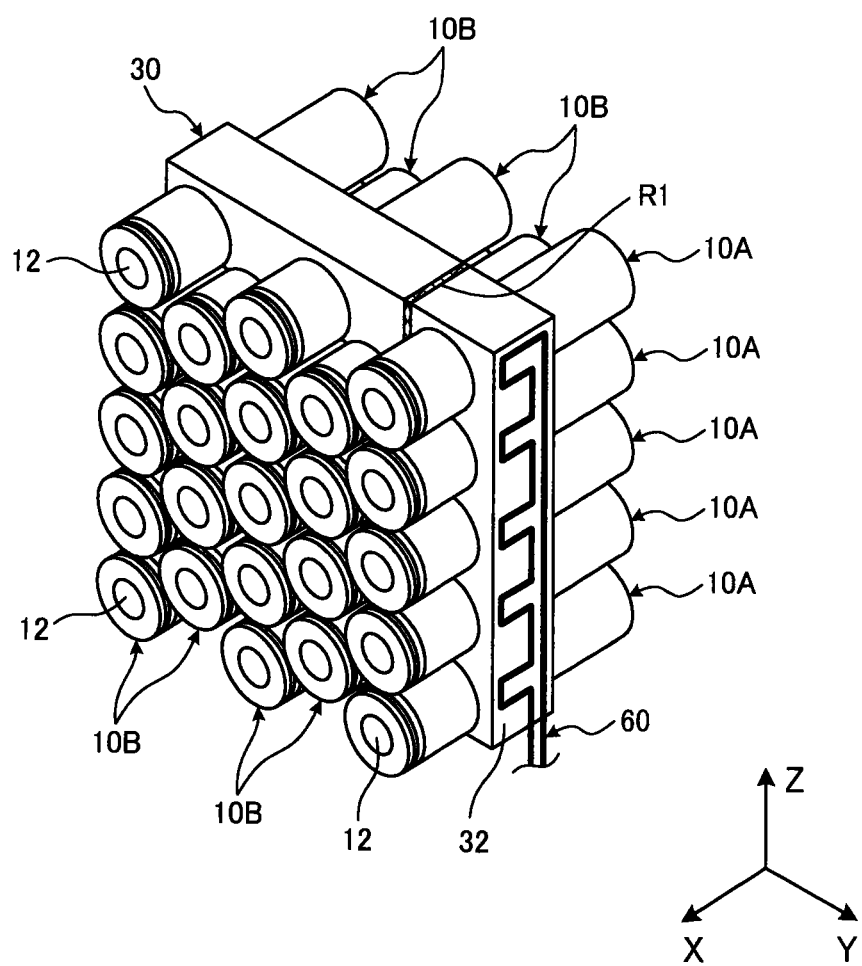
FIG. 5 A diagram for explaining the placement of a heater in Embodiment 1.

The high-power batteries 10A and the high-capacity batteries 10B are placed as shown in FIG. 5. In the present embodiment, five high-power batteries 10A are used and are aligned in the Z direction. All the cells 10 except the high-power batteries 10A are the high-capacity batteries 10B.

The numbers of the high-power batteries 10A and the high-capacity batteries 10B can be set as appropriate in view of the characteristic requirements of the battery pack 1. When the proportion of the high-power batteries 10A is increased in the plurality of cells 10 constituting the battery pack 1, the output of the battery pack 1 can be enhanced without changing the voltage of the battery pack 1. Alternatively, when the proportion of the high-capacity batteries 10B is increased, the electric storage capacity of the battery pack 1 can be increased without changing the voltage of the battery pack 1.

A heater 60 is placed along a side 32 of the holder 30. The side 32 extends in the direction (Z direction) in which the plurality of the high-power batteries 10A are aligned. Thus, the heater 60 is placed along the plurality of high-power batteries 10A. When the heater 60 is energized, the heater 60 can generate heat. Any device which generates heat upon energization can be used as the heater 60.

Figure 6:
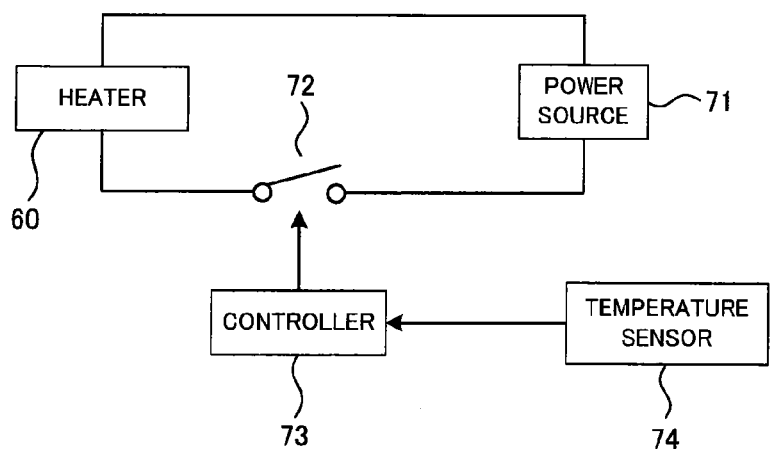
FIG. 6 A schematic diagram showing the configuration of a circuit for driving the heater in Embodiment 1.

As shown in FIG. 6, the heater 60 is connected to a power source 71 and generates heat in response to power from the power source 71. A switch 72 is placed between the heater 60 and the power source 71. When the switch 72 is ON, the power of the power source 71 is supplied to the heater 60. When the switch 72 is OFF, the power of the power source 71 is not supplied to the heater 60. The battery pack 1 can be used or a power source different from the battery pack 1 can be used as the power source 71.

A controller 73 selects ON or OFF of the switch 72 based on the output of a temperature sensor 74. Specifically, the controller 73 turns off the switch 72 when the output of the temperature sensor 74 shows a temperature higher than a threshold value. The controller 73 turns on the switch 72 when the output of the temperature sensor 74 shows a temperature lower than the threshold value.

The threshold value can be predetermined, and information about the threshold value can be stored in a memory. As later described, the threshold value can be determined on the basis of the relationship between the temperature and the output characteristics in the high-power battery 10A. Specifically, a temperature at which the output of the high-power battery 10A tends to be reduced can be determined as the threshold value.

The temperature sensor 74 may be placed at a position where the temperature of the battery pack 1 can be detected. For example, the temperature sensor 74 can be in contact with some of the high-power batteries 10A. Alternatively, the temperature sensor 74 can be fixed to the case 20 of the battery pack 1 such that the temperature sensor 74 is held separate from the cells 10. The number of the temperature sensors 74 can be set as appropriate. When a plurality of temperature sensors 74 are used, the temperature sensors 74 can be placed at different positions of the battery pack 1.

Figure 7:
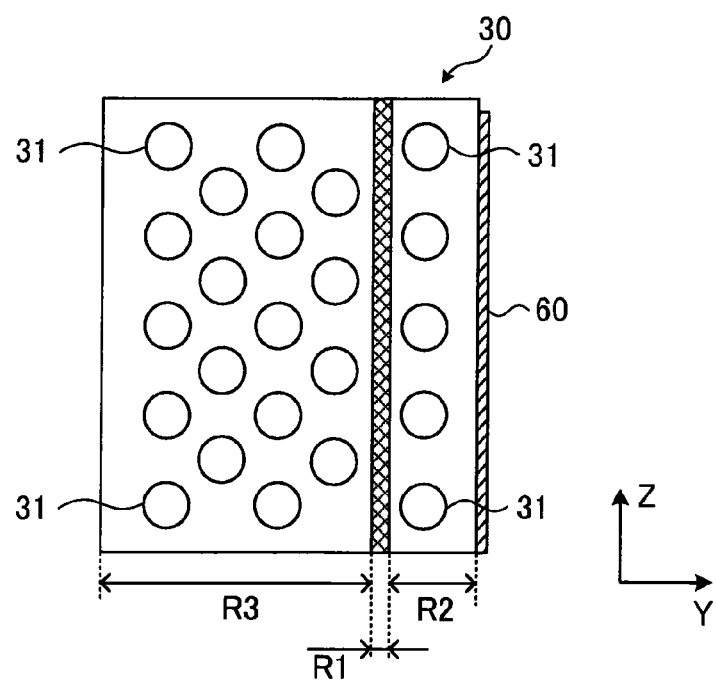
FIG. 7 A diagram for explaining the position of a heat-transfer suppressing region in the holder of Embodiment 1.

When the heater 60 is energized, the heat generated in the heater 60 is transferred to the high-power batteries 10A through the holder 30. This can heat the high-power batteries 10A. In the present embodiment, the holder 30 has a heat-transfer suppressing region R1. As shown in FIG. 7, the heat-transfer suppressing region R1 is provided on the boundary between a region R2 in which the high-power batteries 10A are held and a region R3 in which the high-capacity batteries 10B are held. In other words, the heat-transfer suppressing region R1 is located between the holding portions 31 for holding the high-power batteries 10A and the holding portions 31 for holding the high-capacity batteries 10B.

The heat-transfer suppressing region R1 is provided for suppressing the transfer of the heat generated by the heater 60 from the region R2 to the region R3. Thus, the heat generated by the heater 60 is transferred to the overall region R2, so that the heat can be principally supplied to the high-power batteries 10A.

The heat-transfer suppressing region R1 can be formed of a material having a lower thermal conductivity than that of a material forming the region R2. For example, the regions R2 and R3 can be formed of metal and the region R1 can be formed of resin. The holder 30 can be formed by preparing a member forming the region R1, a member forming the region R2, and a member forming the region R3, and bonding these members together. As described above, the holder portions 31 are formed in the members forming the regions R2 and R3.

While the heat-transfer suppressing region R1 is provided at the position shown in FIG. 5 and FIG. 7 in the present embodiment, the present invention is not limited thereto. The position to provide the heat-transfer suppressing region R1 depends on the positions of the high-power batteries 10A and the high-capacity batteries 10B. It is only required that the heat-transfer suppressing region R1 should be located between the region R2 for holding the high-power batteries 10A and the region R3 for holding the high-capacity batteries 10B as described above.

In general, the cell 10 tends to have a lower output as the temperature drops. Since the high-power batteries 10A are included in the plurality of cells 10 in the present embodiment, it is possible to suppress a reduction in output of the battery pack 1 resulting from the temperature drop. Specifically, even when the temperature drop reduces the outputs of the high-capacity batteries 10B, the outputs of the high-power batteries 10A can be used to suppress a reduction in output of the battery pack 1.

On the other hand, when the temperature drop also reduces the outputs of the high-power batteries 10A, the heater 60 can be driven to heat the high-power batteries 10A to suppress a reduction in output of the battery pack 1.

Since the heater 60 is placed only for the high-power batteries 10A in the present embodiment, the heater 60 can be reduced in size as compared with the case in which the heater 60 is placed for each of the high-power batteries 10A and the high-capacity batteries 10B. The reduced size of the heater 60 can achieve a reduction in consumption power of the heater 60. Since only the high-power batteries 10A are heated principally in the present embodiment, the time taken to heat the cells 10 can be shortened as compared with the case in which both of the high-power batteries 10A and the high-capacity batteries 10B are heated. In other words, the time taken to restore the output of the battery pack 1 can be shortened.

While the heat-transfer suppressing region R1 is provided for the holder 30 in the present embodiment, the heat-transfer suppressing region R1 may be omitted. In other words, the holder 30 may be formed as a single member. As shown in FIG. 5, the heater 60 is placed at a position closer to the high-power batteries 10A than the high-capacity batteries 10B. In other words, the shortest distance between each of the high-power batteries 10A and the heater 60 is smaller than the shortest distance between each of the high-capacity batteries 10B and the heater 60.

Thus, the heat generated by the heater 60 reaches the high-power batteries 10A more easily than the high-capacity batteries 10B. As a result, even when the heat-transfer suppressing region R1 is omitted, the heat from the heater 60 can be principally supplied to the high-power batteries 10A.

In addition, an air layer may be provided in the region corresponding to the heat-transfer suppressing region R1. Specifically, an opening portion can be formed in the region of the holder 30 that corresponds to the heat-transfer suppressing region R1. The formation of the opening portion (air layer) can prevent the transfer of the heat of the heater 60 from the region R2 to the region R3. Since the air layer has a lower thermal conductivity than that of the material forming the holder 30, the heat transfer from the region R2 to the region R3 can be suppressed.

The opening portion can be formed in the holder 30 in view of the mechanical strength of the holder 30. Specifically, a plurality of opening portions can be formed within the region corresponding to the heat-transfer suppressing region R1, rather than a single opening portion formed in the overall region corresponding to the heat-transfer suppressing region R1.

While the placement of the high-power batteries 10A and the high-capacity batteries 10B can be set as appropriate, the position to place the heater 60 can be determined in accordance with the position of the high-power batteries 10A. Specifically, the heat 60 may be placed closer to the high-power batteries 10A than the high-capacity batteries 10B.

Preferably, the plurality of high-power batteries 10A are collectively placed within the Y-Z plane. The collective placement of the plurality of high-power batteries 10A facilitates the placement of the heater 60. When the plurality of high-power batteries 10A are placed along the side of the holder 30 at the position closest to the side of the holder 30 as in the present embodiment, the heater 60 is easily placed.

While the heater 60 is provided for the single holder 30 in the present embodiment, the present invention is not limited thereto. When a plurality of holders 30 are used to hold the plurality of cells 10, the heater 60 can be provided for at least one of the plurality of holders 30.

While the cylinder-type cell 10 is used in the present embodiment, a so-called square-type cell 10 may be used instead of the cylinder-type cell 10. In the square-type cell 10, a power-generating element is housed in a battery case formed in a rectangular shape. When the square-type cell 10 is used, a plurality of cells 10 can be aligned in one direction.

When the square-type cell 10 is used, both of high-power batteries and high-capacity batteries can be used as the cells 10 similarly to the present embodiment. The high-power batteries can be collectively placed and the high-capacity batteries can be collectively placed. When the plurality of high-power batteries are aligned in one direction, the plurality of high-power batteries 10 can be collectively placed. The plurality of high-capacity batteries are also aligned in one direction to allow the collective placement thereof. A heater can be placed only for the high-power batteries similarly to the present embodiment.

While the holder 30 is used to hold the plurality of cells 10 in the present embodiment, the present invention is not limited thereto. Specifically, any structure can be used as long as the plurality of cells 10 can be held at predetermined positioning. While the heater 60 is fixed to the holder 30 in the present embodiment, the heater 60 may be fixed to a member different from the holder 30. For example, the heater 60 can be fixed to the inner wall face of the case 20 opposite to the high-power batteries 10A.

The invention claimed is:

1. A battery pack comprising:
   a first battery and a second battery connected electrically in parallel and performing charge and discharge; and
   a single heater placed at a position closer to the first battery than the second battery and configured to heat the first battery and the second battery,
   wherein the first battery performs charge and discharge with a current larger than that of the second battery, and the second battery has an electric storage capacity larger than that of the first battery.

2. The battery pack according to claim 1, further comprising a holder holding the first battery and the second battery, the single heater being fixed to the holder.

3. The battery pack according to claim 2, wherein the holder is formed of metal.

4. The battery pack according to claim 2, wherein the holder includes:

a first holding portion holding the first battery;
a second holding portion holding the second battery; and
a region placed between the first holding portion and the second holding portion and having a thermal conductivity lower than that of the first holding portion.

5. The battery pack according to claim 4, wherein each of the first holding portion and the second holding portion is formed of metal, and
the region is formed of resin.

6. The battery pack according to claim 1, wherein the battery pack includes a plurality of the first batteries and a plurality of the second batteries.

7. The battery pack according to claim 6, wherein the plurality of first batteries are aligned in one direction, and
the single heater is placed along the direction in which the plurality of first batteries are aligned.

8. The battery pack according to claim 1, wherein each of the first battery and the second battery is a cylinder-type battery.

9. The battery pack according to claim 2, wherein the battery pack includes a plurality of the first batteries and a plurality of the second batteries.

10. The battery pack according to claim 9, wherein the plurality of first batteries are aligned in one direction, and
the single heater is placed along the direction in which the plurality of first batteries are aligned.

11. The battery pack according to claim 4, wherein the battery pack includes a plurality of the first batteries and a plurality of the second batteries.

12. The battery pack according to claim 11, wherein the plurality of first batteries are aligned in one direction, and
the single heater is placed along the direction in which the plurality of first batteries are aligned.

13. The battery pack according to claim 5, wherein the battery pack includes a plurality of the first batteries and a plurality of the second batteries.

14. The battery pack according to claim 13, wherein the plurality of first batteries are aligned in one direction, and
the single heater is placed along the direction in which the plurality of first batteries are aligned.

* * * * *